(12) United States Patent
Ellis

(10) Patent No.: US 8,117,875 B2
(45) Date of Patent: Feb. 21, 2012

(54) RETRACTABLE WHEEL LOCK

(76) Inventor: Phillip D. Ellis, Brooklyn, NY (US)

( * ) Notice: Subject to any disclaimer, the term of this patent is extended or adjusted under 35 U.S.C. 154(b) by 114 days.

(21) Appl. No.: 12/591,553

(22) Filed: Nov. 23, 2009

(65) Prior Publication Data
US 2010/0154492 A1    Jun. 24, 2010

Related U.S. Application Data

(60) Provisional application No. 61/193,783, filed on Dec. 23, 2008.

(51) Int. Cl.
*B62H 5/00* (2006.01)
(52) U.S. Cl. .................. 70/233; 70/14; 70/30; 70/49
(58) Field of Classification Search ............... 70/14, 30, 70/49, 233
See application file for complete search history.

(56) References Cited

U.S. PATENT DOCUMENTS

| | | | |
|---|---|---|---|
| 3,910,602 A * | 10/1975 | Lindner | 224/427 |
| 4,024,741 A * | 5/1977 | Arblaster | 70/233 |
| 4,033,160 A | 7/1977 | Mima | |
| 4,037,441 A * | 7/1977 | Ray | 70/233 |
| 4,051,703 A * | 10/1977 | Plaiss | 70/371 |
| 4,086,795 A * | 5/1978 | Foster et al. | 70/233 |
| 4,126,024 A | 11/1978 | Timmons et al. | |
| 4,186,576 A * | 2/1980 | Means et al. | 70/233 |
| 4,188,808 A | 2/1980 | Valdez | |
| 4,970,883 A * | 11/1990 | Johnson | 70/30 |
| 5,251,464 A * | 10/1993 | Halter | 70/30 |
| 5,289,704 A * | 3/1994 | Johnson | 70/30 |
| 5,408,212 A * | 4/1995 | Meyers et al. | 340/427 |
| 5,768,920 A * | 6/1998 | DeBevoise | 70/18 |
| 6,505,846 B1 * | 1/2003 | Hoffman | 280/274 |
| 6,595,031 B2 * | 7/2003 | Wilson et al. | 70/233 |
| 6,637,244 B2 * | 10/2003 | Haraughty | 70/233 |
| 7,131,298 B1 * | 11/2006 | Haraughty | 70/18 |
| 7,428,833 B2 * | 9/2008 | Tollefson | 70/49 |
| 2002/0083746 A1 | 7/2002 | Cleveland et al. | |
| 2002/0170324 A1 | 11/2002 | Wilson | |
| 2003/0089144 A1 * | 5/2003 | Hoffman | 70/58 |

FOREIGN PATENT DOCUMENTS

GB    2256837 A    12/1992

* cited by examiner

*Primary Examiner* — Suzanne Barrett
(74) *Attorney, Agent, or Firm* — Richard C. Litman

(57) ABSTRACT

The retractable wheel lock has a wheel axle assembly that includes a hub forming a housing with an opening. The hub is freely rotatable about the axle. A retractable cable including a male locking element is coiled in the hub and can be retractably paid out from the hub, guided through a frame of an attached bicycle, around a bike rack, pole, or the like, and then back into a female lock socket affixed to the hub to conveniently secure the bicycle in a theft resistant manner. Alternative embodiments allow a rim to rotate freely around the hub.

6 Claims, 4 Drawing Sheets

RETRACTABLE WHEEL LOCK

CROSS-REFERENCE TO RELATED APPLICATION

This application claims the benefit of U.S. Provisional Patent Application Ser. No. 61/193,783, filed Dec. 23, 2008.

BACKGROUND OF THE INVENTION

1. Field of the Invention

The present invention relates to wheel locks, and more particularly to a retractable wheel lock for a bicycle, motorcycle, or the like.

2. Description of the Related Art

Bicycle theft is a long-standing and serious problem for bicycle owners. The need for an effective theft deterrent has lead to the design of many different bicycle locks and locking systems. One of the most popular bicycle locks is a flexible cable looped at each end and secured with a padlock. The cable is usually snaked around part of the bicycle frame and sometimes through the front wheel and around a bicycle rack, lamppost or other fixed object. The cable is secured with a padlock through the end loops. Some cable locks use an in-line lock integral to the cable instead of the padlock with looped ends. While these types of cable locks are inexpensive and uncomplicated, they have several disadvantages, including the fact that because these cable locks are not tethered to the bicycle, they can be lost. Moreover, in traditional locking systems, the cables and locks must be stored apart from the bicycle, in a saddlebag or backpack for example, or wound around the bicycle frame. In either case, the cable and lock must be unpacked or unwound or both to lock the bicycle. Self-coiling cables present added difficulties in that it is often a struggle to unwind the cable from the frame, align the cable for threading through the frame and front wheel, around a bike rack and then lock the cable in place. Additionally, cable locks stored wound around the bicycle frame are generally not considered aesthetically pleasing.

Thus a retractably extensible locking system solving the aforementioned problems is desired.

SUMMARY OF THE INVENTION

The retractable wheel lock system includes a wheel axle assembly having a hub that forms a housing with an opening. The hub is freely rotatable about the axle. A retractable cable including a male locking element is coiled in the hub and can be retractably paid out through the opening in the hub, guided through a frame of an attached bicycle (or motorcycle of the like), around a bike rack, pole, or the like, and then back into a female lock socket affixed to the hub to conveniently secure the bicycle in a theft resistant manner.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
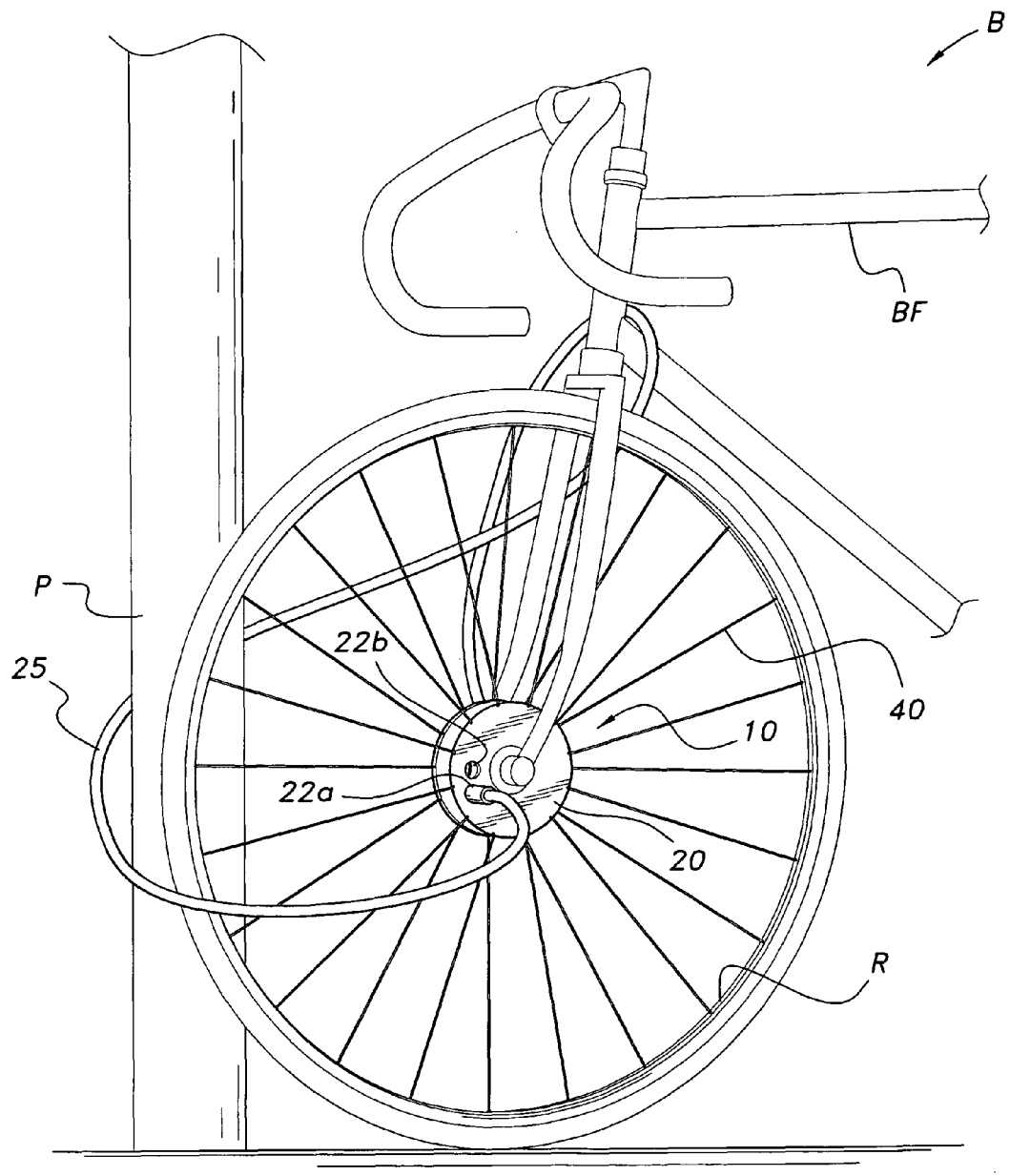
FIG. 1 is an environmental, perspective view of a retractable wheel lock according to the present invention.
Figure 2:
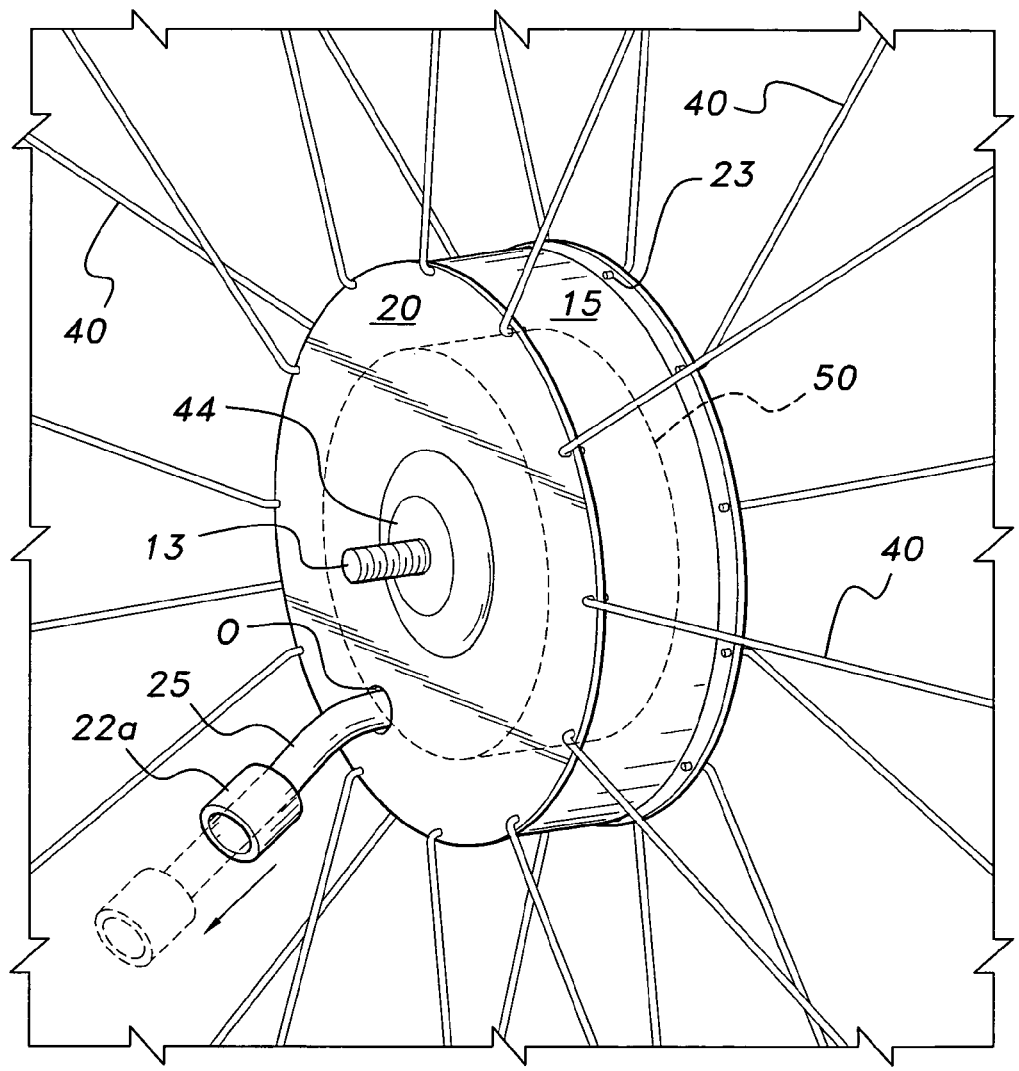
FIG. 2 is a detailed perspective view of a retractable wheel lock according to the present invention.
Figure 3:
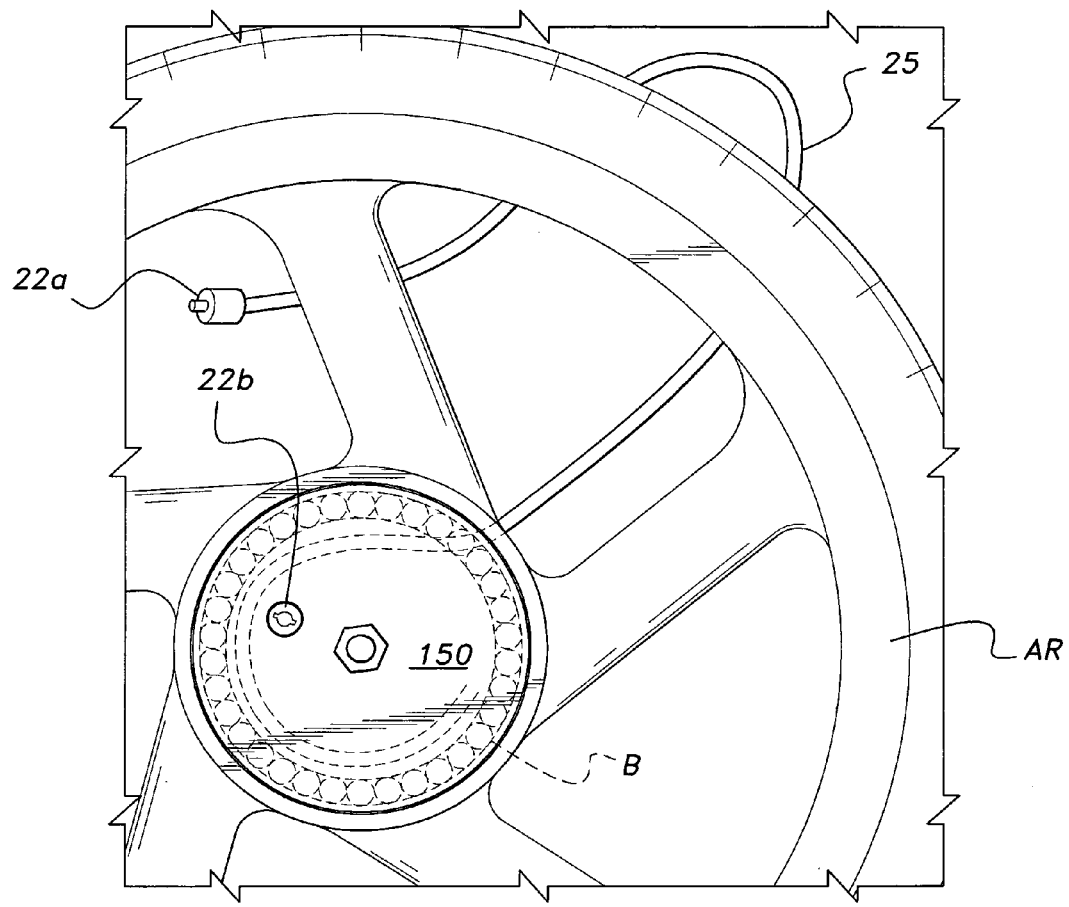
FIG. 3 is a side view of an alternative embodiment of a retractable wheel lock according to the present invention.
Figure 4:
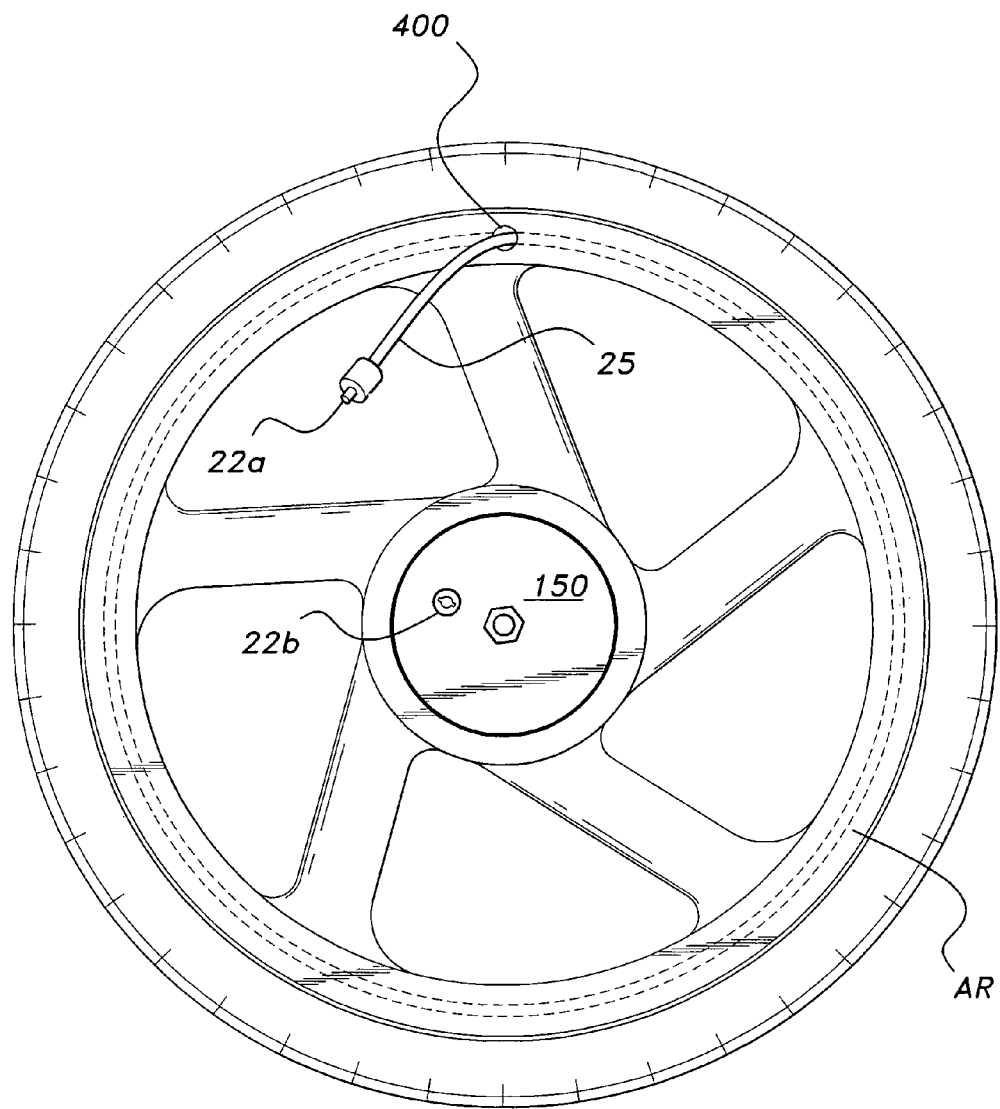
FIG. 4 is a side view of another alternative embodiment of a retractable wheel lock according to the present invention.

As shown in FIGS. 1-2, the retractable wheel lock includes a wheel axle assembly 10 having a hub 15 that forms a housing having an opening. The hub assembly 15 includes circular side plates 20. The side plates 20 include spoke holes 23, which are spaced at intervals along circumferential edges of the side plates 20. Elongate members, for example spokes 40, can be attached to the hub assembly 15 at the spoke holes 23 and secured to the tire rim R. As shown in FIGS. 3 and 4, other types of elongate members can attach the hub assembly to the rim. The hub assembly 15 joins the axle 13 via bearing joint 44, and is therefore freely rotatable about the axle 13.

A retractable cable 25 including a male locking element 22a is spring-biased to form a coil in the hub assembly 15. The locking elements 22a and 22b are typically a key locking assembly. As shown in FIG. 2 the coil is wrapped around a spring-biased spool 50 to bias the coil in a retracted position within hub assembly 15. In normal usage, the rim R and wheel axle assembly 10 are attached to a bicycle B. The cable 25 can be retractably paid out through the opening O in the hub assembly 15, guided through a frame BF of an attached bicycle, around a bike rack, or, as shown in FIG. 1, around a pole P, or the like, and then back into a female lock assembly 22b (shown in FIG. 1) affixed to the side plate 20 of hub assembly 15 to conveniently secure the bicycle B in a theft resistant manner.

As shown in FIG. 3, in a first alternative configuration, the retractable wheel lock has a hub assembly 150 that is configured to be stationary while the rim AR rotates around the hub assembly 150 over bearings B. The cable 25 is spring-biased to retract inside the hub assembly 150 when not in use for securement.

In a second alternative configuration, as shown in FIG. 4, the retractable wheel lock has the cable 25 spring-biased to retract into the rim AR via a hole 400 in the rim AR when not in use.

It is to be understood that the present invention is not limited to the embodiment described above, but encompasses any and all embodiments within the scope of the following claims.

I claim:

1. A wheel rim, comprising:
   a hub forming a housing, the housing having an opening defined therein;
   a spring-biased, flexible member coiled within the hub housing, the flexible member being extensible through the opening defined in the hub;
   an axle disposed through the hub, the hub being freely rotatable about the axle;
   a first locking member attached to a free end of the flexible member;
   a second locking member affixed to the hub, the second locking member releasably engaging the first locking member;
   a rim; and elongate members interconnecting the hub to the rim.

2. A retractable wheel lock, comprising:

a hub;

a rim having an inner periphery and an outer periphery concentric to the inner periphery;

elongate members interconnecting the rim's inner periphery to the rim's outer periphery;

bearings disposed around an outer portion of the hub, the bearings allowing the inner periphery of the rim freely rotate around the hub, thereby forming a wheel assembly;

a spring-biased, flexible member attached to and coiled within the wheel assembly, the flexible member being extensible through an opening defined in the wheel assembly;

a first locking member attached to the flexible member;

a second locking member affixed to the hub, the second locking member releasably engaging the first locking member thereto.

3. The retractable wheel lock according to claim 2, wherein the opening defined in said wheel assembly is disposed in said hub, said coiled flexible member being extensible through the opening from said hub.

4. The retractable wheel lock according to claim 2, wherein the opening defined in said wheel assembly is disposed in said rim, said coiled flexible member being extensible through the opening from said rim.

5. The retractable wheel lock according to claim 4, wherein the opening in said rim is located proximate said rim's outer periphery.

6. The retractable wheel lock according to claim 1, wherein said wheel assembly is a bicycle wheel assembly and said elongate members are spokes.

* * * * *